(12) United States Patent
Kato

(10) Patent No.: US 11,731,513 B2
(45) Date of Patent: Aug. 22, 2023

(54) DISPLAY CONTROL DEVICE, DISPLAY SYSTEM, DISPLAY METHOD, AND PROGRAM

(71) Applicant: TOYOTA JIDOSHA KABUSHIKI KAISHA, Aichi-ken (JP)

(72) Inventor: Masaki Kato, Kawasaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/880,661

(22) Filed: Aug. 4, 2022

(65) Prior Publication Data

US 2023/0060408 A1 Mar. 2, 2023

(30) Foreign Application Priority Data

Aug. 25, 2021 (JP) ................. 2021-137395

(51) Int. Cl.
*B60K 35/00* (2006.01)
*G02C 11/00* (2006.01)
*G02B 27/01* (2006.01)
*G02C 7/04* (2006.01)

(52) U.S. Cl.
CPC .......... *B60K 35/00* (2013.01); *G02B 27/0101* (2013.01); *G02C 7/04* (2013.01); *G02C 11/10* (2013.01); *B60K 2370/1529* (2019.05); *B60K 2370/194* (2019.05); *G02B 2027/014* (2013.01); *G02B 2027/0141* (2013.01)

(58) Field of Classification Search
CPC ............ B60K 35/00; B60K 2370/1529; B60K 2370/194; G02B 27/0101; G02B 2027/014; G02B 2027/0141; G02C 7/04; G02C 11/10
See application file for complete search history.

(56) References Cited

U.S. PATENT DOCUMENTS

| | | | |
|---|---|---|---|
| 2018/0285642 A1* | 10/2018 | Nishimura | ............ G01J 3/0264 |
| 2020/0357203 A1 | 11/2020 | Takahashi et al. | |
| 2021/0049925 A1* | 2/2021 | Robinson | ................. G09B 9/08 |
| 2022/0046156 A1* | 2/2022 | Lemoff | .................. G02C 11/10 |

FOREIGN PATENT DOCUMENTS

| | | |
|---|---|---|
| JP | 2009248721 A | 10/2009 |
| JP | 2020183148 A | 11/2020 |

* cited by examiner

*Primary Examiner* — Brent D Castiaux
(74) *Attorney, Agent, or Firm* — Hauptman Ham, LLP

(57) ABSTRACT

A display control device includes a processor. The processor acquires a vehicle state, and displays, at spatial coordinates set above an instrument panel in a vehicle cabin, a predetermined icon corresponding to the vehicle state via a lens that is able to be attached to an eyeball of an occupant. Thus, the occupant can grasp the vehicle state without having the vehicle condition displayed on a display in a vehicle cabin.

10 Claims, 4 Drawing Sheets

DISPLAY CONTROL DEVICE, DISPLAY SYSTEM, DISPLAY METHOD, AND PROGRAM

CROSS-REFERENCE TO RELATED APPLICATION

This application claims priority to Japanese Patent Application No. 2021-137395 filed on Aug. 25, 2021, incorporated herein by reference in its entirety.

BACKGROUND

1. Technical Field

The present disclosure relates to a display control device, a display system, a display method, and a program.

2. Description of Related Art

Japanese Unexamined Patent Application Publication No. 2009-248721 (JP 2009-248721 A) discloses a technique of displaying a virtual image superimposed on a driver's field of view by a head-up display device. In this JP 2009-248721 A, a frame-shaped display image is displayed when the visibility of an obstacle as seen by the driver is high, and a display image imitating the obstacle is displayed at a position of the obstacle when the visibility of the obstacle is low.

SUMMARY

When displaying an image by a head-up display device as disclosed in JP 2009-248721 A, a display range is limited. Thus, there is room for improvement in displaying a vehicle state without obstructing a view of an occupant.

An object of the present disclosure is to obtain a display control device, a display system, a display method, and a program capable of displaying a vehicle state without obstructing a view of an occupant.

A display control device according to some embodiments includes a processor. The processor acquires a vehicle state; and displays, at spatial coordinates set above an instrument panel in a vehicle cabin, a predetermined icon corresponding to the vehicle state via a lens that is able to be attached to an eyeball of an occupant.

In the display control device according to some embodiments, the vehicle state is acquired by the processor. In addition, the processor displays the predetermined icon corresponding to the vehicle state via the lens that can be attached to the eyeball of the occupant. Here, since the processor displays the icon at the spatial coordinates set above the instrument panel in the vehicle cabin, the wearer of the lens can grasp the vehicle state without lowering the line-of-sight. Further, since the icon is displayed via the lens, the icon can be displayed at a position that does not obstruct the view of the occupant as compared with the configuration in which the vehicle state is displayed on the display in the vehicle cabin.

In the display control device according to some embodiments, the processor displays the icon forward of a driver's seat in a vehicle front-rear direction and on both sides of the driver's seat in a vehicle width direction.

In the display control device according to some embodiments, since the icons are displayed forward of the driver's seat in the vehicle front-rear direction and on both sides of the driver's seat in the vehicle width direction, the front view is not obstructed even when the icons are displayed. Further, since the icon is displayed in a peripheral visual field in a state in which the wearer seated in the driver's seat looking toward the front of the vehicle, the icon can be confirmed without moving the line-of-sight.

The display control device according to some embodiments, the processor acquires a line-of-sight direction of a wearer of the lens, and when the acquired line-of-sight direction overlaps with the icon, the processor displays a description of the icon by characters or animation.

In the display control device according to some embodiments, content of the icon can be grasped only by directing the line-of-sight to the icon. In addition, it is possible to reduce the annoyance as compared with the configuration in which content of the icon is always displayed.

In the display control device according to some embodiments, the processor displays an icon regarding a warning by emphasizing the icon regarding the warning more than another icon.

The display control device according to some embodiments can alert the occupant by displaying the icon related to a warning to be emphasized more than the other icons.

The display system according to some embodiments includes: the display control device according to any one of claims 1 to 4; and the lens according to any one of claims 1 to 4, the lens being able to be attached to the eyeball of the occupant.

The display method according to some embodiments includes: acquiring a vehicle state; and displaying, at spatial coordinates set above an instrument panel in a vehicle cabin, a predetermined icon corresponding to the vehicle state via a lens that is able to be attached to an eyeball of an occupant.

A program according to some embodiments causes a computer to execute a process including: acquiring a vehicle state; and displaying, at spatial coordinates set above an instrument panel in a vehicle cabin, a predetermined icon corresponding to the vehicle state via a lens that is able to be attached to an eyeball of an occupant.

As described above, according to the display control device, the display system, the display method, and the program according to the present disclosure, the vehicle state can be displayed without obstructing the view of the occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A display system S according to the embodiment will be described with reference to the drawings.

Hardware Configuration of Display System S

Figure 1:
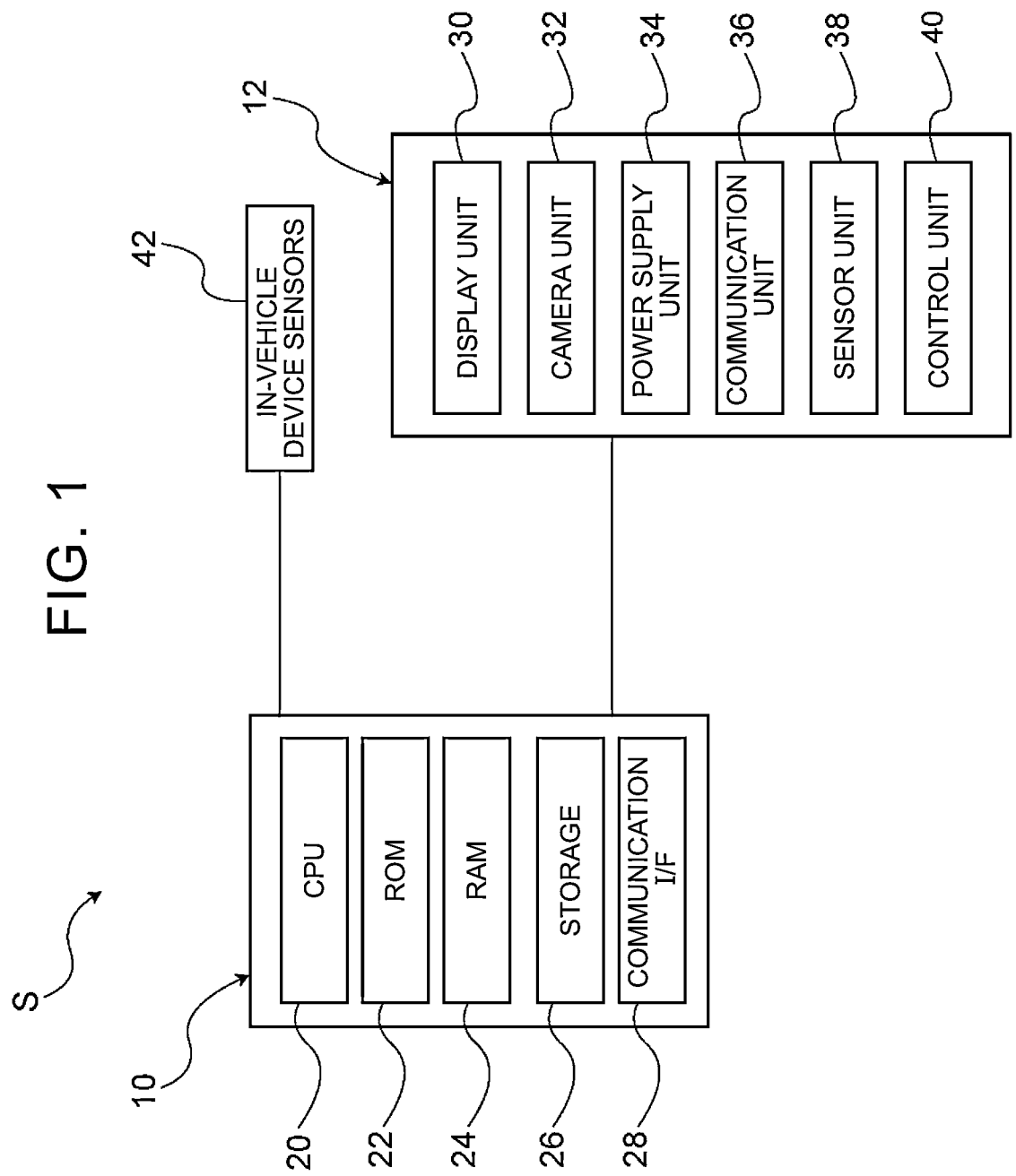
FIG. 1 is a block diagram showing a hardware configuration of a display system according to an embodiment.

As shown in FIG. 1, the display system S includes a display control device 10.

The display control device 10 is configured to include a central processing unit (CPU: processor) 20, a read-only memory (ROM) 22, a random access memory (RAM) 24, a storage 26, and an communication interface (I/F) 28. The components above are connected via an internal bus so as to be mutually communicable.

The CPU 20 is a central arithmetic processing unit that executes various programs and controls each of the units. That is, the CPU 20 reads the program from the ROM 22 or the storage 26, and executes the program using the RAM 24 as a work area. The CPU 20 controls each of the above components and performs various arithmetic processes in accordance with the programs stored in the ROM 22 or the storage 26.

The ROM 22 stores various programs and various data. The RAM 24 temporarily stores a program or data as a work area. The storage 26 is a non-transitory recording medium that is composed of a hard disk drive (HDD) or a solid state drive (SSD) and stores various programs including an operating system and various types of data. In the present embodiment, the ROM 22 or the storage 26 stores a program for performing a display process, etc.

The communication I/F 28 is an interface for the display control device 10 to communicate with an external server and other devices, and standards such as a controller area network (CAN), Ethernet (registered trademark), long term evolution (LTE), fiber distributed data interface (FDDI), and Wi-Fi (registered trademark) are used.

The display control device 10 is electrically connected to in-vehicle device sensors 42. The in-vehicle device sensors 42 are sensors for detecting a state of an in-vehicle device, that is, a vehicle state. The in-vehicle device sensors 42 include, for example, sensors such as a hydraulic sensor, a brake system sensor, a battery voltage sensor, a seat belt sensor, a fuel level sensor, an airbag sensor, a water temperature sensor, and a hybrid system check sensor.

Further, the display control device 10 is electrically connected to an AR contact lens 12 serving as a lens. The AR contact lens 12 is a head-mounted display type wearable device that uses augmented reality (AR) technology to superimpose and display contents such as images and characters on the scenery outside the vehicle.

As an example, the AR contact lens 12 of the present embodiment includes a display unit 30, a camera unit 32, a power supply unit 34, a communication unit 36, a sensor unit 38, and a control unit 40.

Figure 2:
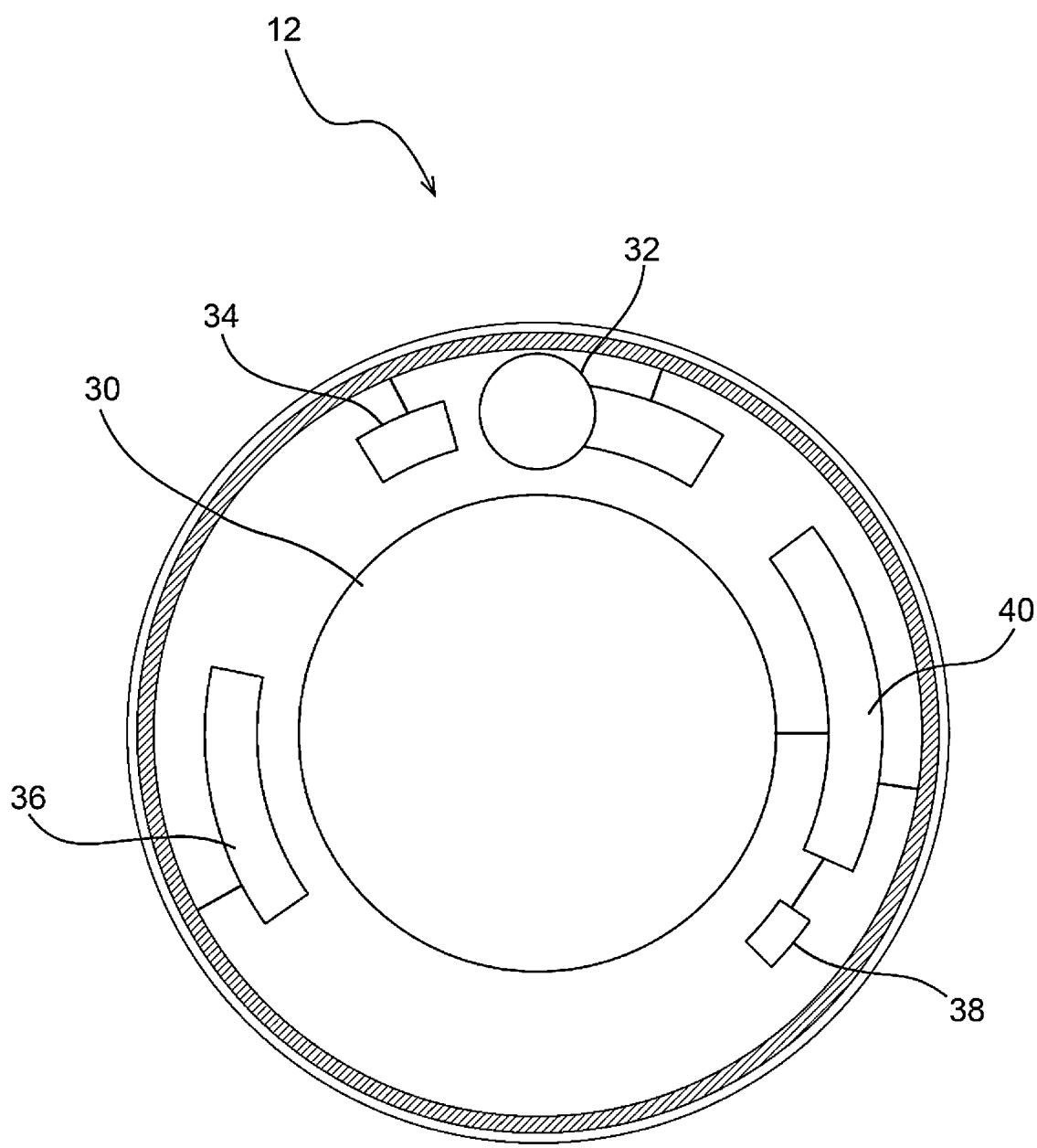
FIG. 2 is a schematic diagram of an AR contact lens according to the embodiment.

As shown in FIG. 2, the display unit 30 is arranged in the center of the AR contact lens 12 and corresponds to a position of a wearer's pupil. Then, the display unit 30 displays contents such as images, characters, and icons to the wearer. The display unit 30 according to the present embodiment is a transmissive display, and includes at least a plurality of light emitting elements and a plurality of light receiving elements for detecting a line-of-sight that receive light reflected by the surface of the eyeball of the occupant.

The camera unit 32 is arranged around the display unit 30 and has a function of photographing the outside of the AR contact lens 12. For example, the camera unit 32 includes an image pickup lens and a drive unit that drives the image pickup lens, and captures a landscape in the line-of-sight direction of the wearer of the AR contact lens 12.

The power supply unit 34 is arranged around the display unit 30 and is a unit for supplying electric power to each of the units constituting the AR contact lens 12. The power supply unit 34 may be configured by a small battery, or may be a unit that supplies electric power by using radio frequency (RF) harvesting or a solar cell.

The communication unit 36 is arranged around the display unit 30 and is a unit that communicates with an external communication terminal such as the display control device 10. A short-range wireless communication standard such as Bluetooth (registered trademark) is applied to the communication unit 36. The communication unit 36 receives data of content to be displayed by the display unit 30 from the display control device 10. Further, the communication unit 36 transmits the image pickup data captured by the camera unit 32 and the data acquired by the sensor unit 38.

The sensor unit 38 includes a sensor for measuring the electrical resistance of tear fluid. For example, the sensor unit 38 detects the amount of the tear fluid by measuring the electrical resistance value of the tear fluid. Further, the sensor unit 38 may be configured to include an illuminance sensor or the like that detects external illuminance.

The control unit 40 controls each of the units of the display unit 30, the camera unit 32, the power supply unit 34, the communication unit 36, and the sensor unit 38. For example, the control unit 40 is configured as a microcomputer having a CPU, ROM, and RAM.

Functional Configuration of Display Control Device 10

The display control device 10 realizes various functions using hardware resources mentioned above. The functional configuration realized by the display control device 10 will be described with reference to FIG. 3.

Figure 3:
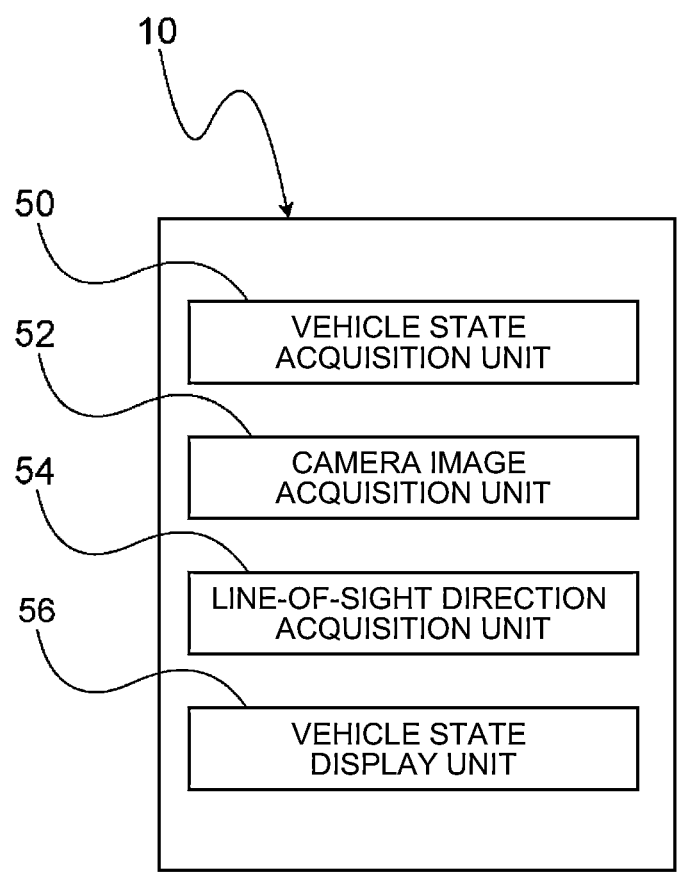
FIG. 3 is a block diagram showing a functional configuration of the display control device according to the embodiment.

As shown in FIG. 3, the display control device 10 includes a vehicle state acquisition unit 50, a camera image acquisition unit 52, a line-of-sight direction acquisition unit 54, and a vehicle state display unit 56 as functional configurations. Each unit in the functional configuration is realized by the CPU 20 as the CPU 20 reads and executes the program stored in the ROM 22 or the storage 26.

The vehicle state acquisition unit 50 acquires a vehicle state. Specifically, the vehicle state acquisition unit 50 acquires the vehicle state by receiving information of the in-vehicle device detected by the in-vehicle device sensors 42. As an example, the vehicle state acquisition unit 50 of the present embodiment is configured to acquire information regarding an abnormality in the vehicle state. Specifically, the vehicle state acquisition unit 50 acquires a vehicle state such as an abnormality in the hydraulic sensor, an abnormality in the brake system sensor, an abnormality in the battery voltage sensor, an abnormality in the seat belt sensor, an abnormality in the fuel level sensor, an abnormality in the airbag sensor, an abnormality in the water temperature sensor, and an abnormality in the hybrid system.

The abnormality in the oil pressure sensor refers to a state in which the remaining amount of engine oil is out of a normal range. The abnormality of the brake system sensor refers to the abnormality of the antilock brake system (ABS) sensor. The abnormality in the battery voltage sensor refers to a state in which the battery voltage is out of the normal range. The abnormality in the seatbelt sensor refers to the abnormality that is transmitted when a seatbelt corresponding to a seat in which an occupant is seated is not fastened. The abnormality in the hybrid system refers to the abnormality that is transmitted when the abnormality occurs in a motor or a high voltage system, or when the remaining battery level is low.

The camera image acquisition unit 52 acquires an image in the line-of-sight direction of the wearer captured by the camera unit 32 of the AR contact lens 12. Further, the line-of-sight direction acquisition unit 54 detects the line-of-sight direction of the wearer based on the image acquired by the camera image acquisition unit 52. For example, the line-of-sight direction acquisition unit 54 may detect the center of the image as the line-of-sight direction.

The vehicle state display unit 56 displays a predetermined icon corresponding to the vehicle state via the AR contact lens 12 at spatial coordinates set above an instrument panel in a vehicle cabin. Specifically, the vehicle state display unit 56 displays icons on both sides in the vehicle width direction with respect to the driver's seat, in a space in front of the driver's seat and above the instrument panel. The icon is, for example, a telltale defined as an agreement rule.

Further, the vehicle state display unit 56 may divide the icon to be displayed on the right side of the driver's seat and the icon to be displayed on the left side in accordance with the type of the telltale. For example, the telltale that may have a more serious effect on the driving of the vehicle may be displayed on the right side, and the telltale that has little effect on the driving of the vehicle itself may be displayed on the left side. Further, the vehicle state display unit 56 displays the warning icon (telltale) to be more emphasized than the other icons. For example, the vehicle state display unit 56 may display the warning icon darker than the other icons. Further, the vehicle state display unit 56 may display the warning icon to be larger than the other icons. Further, the vehicle state display unit 56 may display the warning icon by making the warning icon blink.

Furthermore, in the present embodiment, as an example, when the line-of-sight direction of the wearer of the AR contact lens 12 acquired by the line-of-sight direction acquisition unit 54 overlaps with the icon, the vehicle state display unit 56 displays the description of the icon by using characters or animation. Specifically, when the state in which the line-of-sight direction overlaps the icon for a predetermined time or more is maintained, the description of the icon is displayed by characters or animation by the vehicle state display unit 56.

As an example, when the line-of-sight direction of the wearer of the AR contact lens 12 overlaps with the icon of the hydraulic sensor for the predetermined time or more, the vehicle state display unit 56 displays a predetermined message around the icon of the hydraulic sensor. For example, the vehicle state display unit 56 may display the message "Please check the remaining amount of engine oil." around the icon of the oil pressure sensor.

Further, for example, in a state where an icon imitating the characters "READY" is displayed, which indicates the state in which the hybrid system can be used, when the line-of-sight direction of the wearer of the AR contact lens 12 overlaps the characters "READY" for a predetermined time or longer, the vehicle state display unit 56 displays a message indicating that the hybrid system has become available.

The vehicle state display unit 56 may display additional information by animation instead of the message. For example, when the line-of-sight direction of the wearer of the AR contact lens 12 overlaps with the telltale of the seatbelt sensor for a predetermined time or more, the vehicle state display unit 56 may display an action of wearing the seatbelt by animation.

Operations

Next, operations of the embodiment will be described.

Display Process

Figure 4:
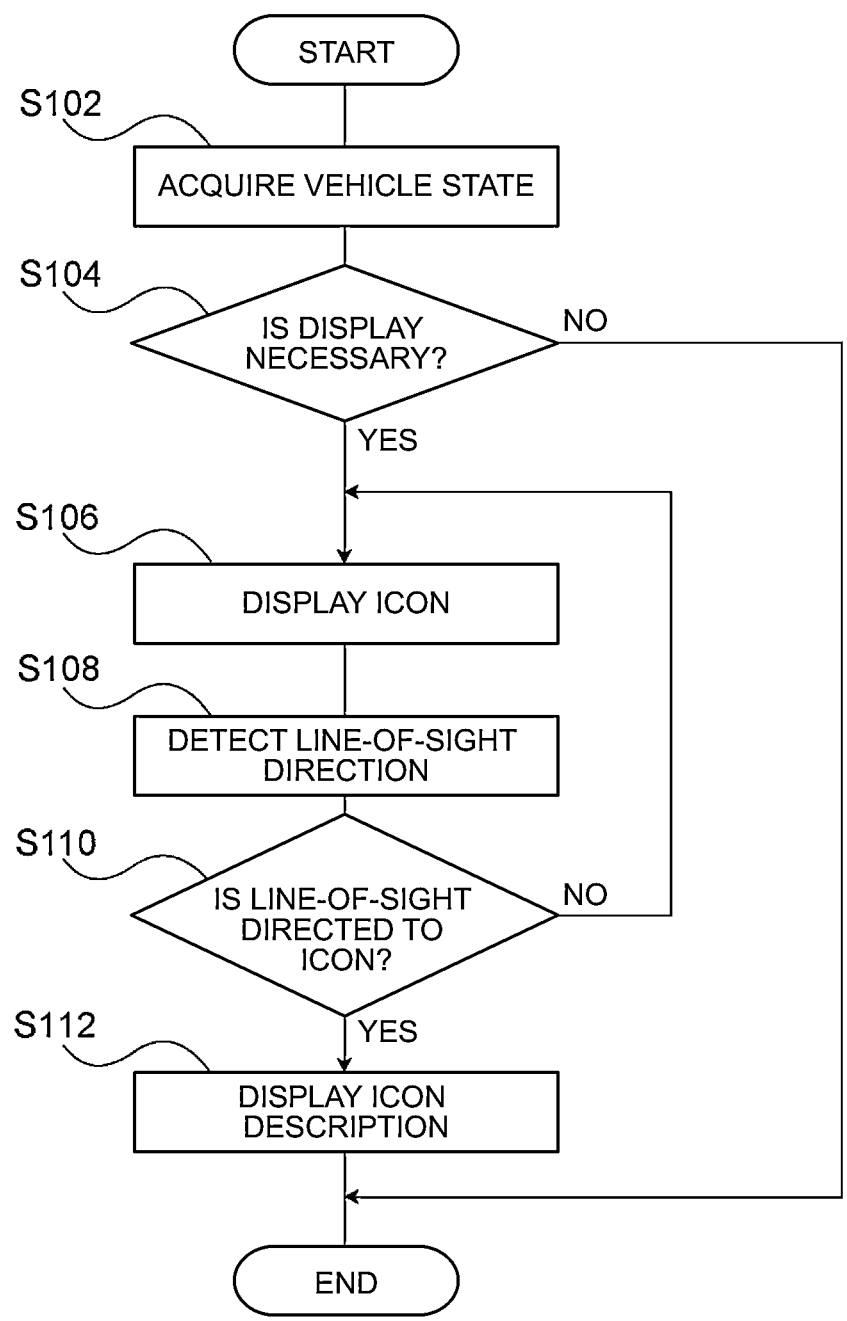
FIG. 4 is a flowchart showing an example of a flow of a display process in the embodiment.

An example of the display process by the display control device 10 will be described with reference to the flowchart shown in FIG. 4. The display process is executed as the CPU 20 reads a display program from the ROM 22 or the storage 26, deploys the program to the RAM 24, and executes the program.

The CPU 20 acquires the vehicle state in step S102. Specifically, the CPU 20 acquires information on the in-vehicle device detected by the in-vehicle device sensors 42 by the function of the vehicle state acquisition unit 50.

In step S104 the CPU 20 determines whether it is necessary to display the icon. Specifically, when the vehicle state acquired by the vehicle state acquisition unit 50 is a display target item, the CPU 20 affirms step S104 and proceeds to the process of step S106. When the vehicle state is not the display target item, the CPU 20 negates step S104 and ends the display process.

The CPU 20 displays the icon in step S106. Specifically, the CPU 20 displays the icon at the spatial coordinates set above the instrument panel in the vehicle cabin by using the function of the vehicle state display unit 56. Since the icon is displayed by the display unit 30 of the AR contact lens 12, only the wearer wearing the AR contact lens 12 can visually recognize the icon.

Subsequently, the CPU 20 detects the line-of-sight direction in step S108. Specifically, the CPU 20 detects the line-of-sight direction of the wearer of the AR contact lens 12 by using the function of the line-of-sight direction acquisition unit 54.

The CPU 20 determines in step S110 whether the line-of-sight direction of the wearer is directed to the icon. Specifically, when the line-of-sight direction of the wearer detected by the line-of-sight direction acquisition unit 54 overlaps with the icon for a predetermined time or more, the CPU 20 affirms step S110 and proceeds to the process of step S112. Further, when the line-of-sight direction of the wearer is not directed to the icon, the CPU 20 returns to the process of step S106 and maintains displaying the icon.

The CPU 20 displays the description of the icon in step S112. Specifically, with characters or animation, the CPU 20 displays the description of the icon that the wearer is looking at by using the function of the vehicle state display unit 56. Then, the CPU 20 ends the display process.

As described above, in the display control device 10 according to the present embodiment, the vehicle state display unit 56 displays a predetermined icon corresponding to the vehicle state via the AR contact lens 12 that can be worn on the eyeball of the occupant. Thus, the occupant can grasp the vehicle state without having the vehicle condition displayed on a display in a vehicle cabin. Further, since the display area is not limited as compared with the configuration in which the vehicle state is displayed on the windshield glass by a head-up display device or the like, the vehicle state can be displayed without obstructing the view of the occupant.

Further, since the vehicle state display unit 56 displays the icon at the spatial coordinates set above the instrument panel in the vehicle cabin, the wearer of the lens can grasp the vehicle state without lowering the line-of-sight.

Further, in the present embodiment, the vehicle state display unit 56 displays icons forward of the driver's seat in a vehicle front-rear direction and on both sides of the driver's seat in the vehicle width direction. thus, even when the icon is displayed, the front view is not obstructed. That is, it is possible to suppress the icon from obstructing the front view while the wearer is driving. Further, since the icon is displayed in a peripheral visual field in a state in which the wearer seated in the driver's seat looking toward the front of the vehicle, the icon can be confirmed without moving the line-of-sight. In particular, since the icon is displayed via the AR contact lens 12, the wearer's field of view is wider than when a glasses-type display device such as smart glasses are used, and the icon can be recognized even when the icon is displayed in the peripheral field of view.

Furthermore, in the present embodiment, since the description of the icon is displayed by characters or animation by just directing the line-of-sight to the icon, the content of the icon can be easily grasped. On the other hand, since the amount of displayed information can be reduced as compared with the configuration in which the content of the icon is always displayed, annoyance can be reduced.

In the present embodiment, the occupant can be alerted by displaying the icon related to a warning to be emphasized more than the other icons.

Although the display system S and the display control device 10 according to the present embodiment has been described above, the disclosure can be implemented in various modes without departing from the scope of the disclosure. As an example, as shown in FIG. 2 in the embodiment described above, the AR contact lens 12 is configured to include the display unit 30, the camera unit 32, the power supply unit 34, the communication unit 36, the sensor unit 38, and the control unit 40. That is, another configuration may be adopted as long as it can be attached to the eyeball of the occupant and the icon can be displayed in the spatial coordinates.

What is claimed is:

1. A display control device, comprising:
   a processor,
   wherein the processor is configured to
   acquire a vehicle state; and
   cause a lens that is attachable to an eyeball of an occupant to display, only at spatial coordinates set above an instrument panel in a vehicle cabin, a predetermined icon corresponding to the vehicle state.

2. The display control device according to claim 1, wherein the processor is configured to cause the lens to display the icon forward of a driver's seat in a vehicle front-rear direction and on two sides of the driver's seat in a vehicle width direction.

3. The display control device according to claim 1, wherein
   the processor is configured to acquire a line-of-sight direction of the occupant when the lens is attached to the eyeball of the occupant, and
   in response to the acquired line-of-sight direction overlapping with the icon, the processor is configured to cause the lens to display a description of the icon by characters or animation.

4. The display control device according to claim 1, wherein the processor is configured to cause the lens to display an icon regarding a warning by emphasizing the icon regarding the warning more than another icon.

5. A display system, comprising:
   the display control device according to claim 1; and
   the lens according to claim 1, the lens being able to be attached to the eyeball of the occupant.

6. The display control device according to claim 1, wherein
   the processor is configured to acquire a line-of-sight direction of the occupant when the lens is attached to the eyeball of the occupant.

7. The display control device according to claim 6, wherein
   in response to the acquired line-of-sight direction overlapping with the icon, the processor is configured to cause the lens to display a description of the icon by animation.

8. The display control device according to claim 6, wherein
   in response to the acquired line-of-sight direction not overlapping with the icon, the processor is configured to cause the lens to maintain displaying the icon.

9. A display method, comprising:
   acquiring a vehicle state; and
   displaying, only at spatial coordinates set above an instrument panel in a vehicle cabin, a predetermined icon corresponding to the vehicle state via a lens that is able to be attached to an eyeball of an occupant.

10. A non-transitory storage medium that stores a program for causing a computer to execute a method comprising:
    acquiring a vehicle state; and
    displaying, only at spatial coordinates set above an instrument panel in a vehicle cabin, a predetermined icon corresponding to the vehicle state via a lens that is able to be attached to an eyeball of an occupant.

* * * * *